United States Patent
Kuroda

(10) Patent No.: US 9,135,360 B2
(45) Date of Patent: Sep. 15, 2015

(54) INFORMATION TRANSMISSION APPARATUS, CONTROL METHOD THEREOF, AND RECORDING MEDIUM STORING COMPUTER PROGRAM

(75) Inventor: Shigeki Kuroda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 13/165,625

(22) Filed: Jun. 21, 2011

(65) Prior Publication Data

US 2011/0320928 A1     Dec. 29, 2011

(30) Foreign Application Priority Data

Jun. 29, 2010   (JP) ................................ 2010-148200

(51) Int. Cl.
    *G06F 17/22*     (2006.01)
    *G06F 17/30*     (2006.01)
    (Continued)

(52) U.S. Cl.
CPC ...... *G06F 17/30893* (2013.01); *G06F 11/0733* (2013.01); *G06F 11/0748* (2013.01); *G06F 11/0769* (2013.01); *G06F 11/0775* (2013.01); *G06F 11/327* (2013.01); *H04N 1/00413* (2013.01); *H04N 1/00435* (2013.01); *H04N 1/00464* (2013.01); *H04N 1/00472* (2013.01);
(Continued)

(58) Field of Classification Search
CPC . G06F 17/30893; G06F 3/1203; G06F 3/121; G06F 3/1234; G06F 3/1259; G06F 3/1285; G06F 11/0733; G06F 11/0748; G06F 11/0769; G06F 11/0775; G06F 11/327; H04N 1/00435; H04N 1/00472; H04N 1/00973; H04N 2201/0072; H04N 1/00413; H04N 1/00464; H04N 1/00474; H04N 1/00477
USPC .......... 715/203, 205, 234, 273, 274, 705, 730
See application file for complete search history.

(56) References Cited

U.S. PATENT DOCUMENTS 6,115,132 A *   9/2000   Nakatsuma et al. ......... 358/1.14
7,239,409 B2 *   7/2007   Parry ........................... 358/1.15
(Continued)

FOREIGN PATENT DOCUMENTS

| JP | 2002-007095 A | 1/2002 |
|---|---|---|
| JP | 2006-140898A A | 6/2006 |
| JP | 2008-276419A A | 11/2008 |

OTHER PUBLICATIONS

Paul McFedries, "Microsoft Office Powerpoint 2007: Top 100 Simplified Tips and Tricks", Section title: 'Publish Your Presentation Directly to a Web Site', publisher: John Wiley & Sons, published: May 29, 2007, pp. 1-5).*

*Primary Examiner* — Stephen Hong
*Assistant Examiner* — Wilson Tsui
(74) *Attorney, Agent, or Firm* — Canon USA Inc. IP Division

(57) ABSTRACT

An information transmission apparatus generates a web page showing information of the information transmission apparatus and containing image data indicating a common screen with a screen to be displayed on a display unit provided in the information transmission apparatus, and transmits the generated web page to an information processing apparatus in response to a request from the information processing apparatus. Further, in a case where the screen to be displayed on the display unit is one of a plurality of relevant screens, the information transmission apparatus acquires image data of each of the relevant screens, and generates the web page containing the image data of each of the acquired screens.

9 Claims, 12 Drawing Sheets

(51) Int. Cl.
*G06F 11/07* (2006.01)
*G06F 11/32* (2006.01)
*H04N 1/00* (2006.01)
*G06F 3/12* (2006.01)

(52) U.S. Cl.
CPC ....... *H04N 1/00474* (2013.01); *H04N 1/00477* (2013.01); *H04N 1/00973* (2013.01); *G06F 3/121* (2013.01); *G06F 3/1203* (2013.01); *G06F 3/1234* (2013.01); *G06F 3/1259* (2013.01); *G06F 3/1285* (2013.01); *H04N 2201/0072* (2013.01)

(56) References Cited

U.S. PATENT DOCUMENTS

| | | | |
|---|---|---|---|
| 7,260,751 B2* | 8/2007 | Fujinawa et al. | 714/47.3 |
| 7,668,912 B2* | 2/2010 | Nelson et al. | 709/204 |
| 7,878,808 B1* | 2/2011 | Stumm et al. | 434/118 |
| 2003/0172148 A1* | 9/2003 | Simpson et al. | 709/224 |
| 2006/0195495 A1* | 8/2006 | Asano | 708/111 |
| 2007/0015118 A1* | 1/2007 | Nickell et al. | 434/118 |

* cited by examiner

FIG.11

INFORMATION TRANSMISSION APPARATUS, CONTROL METHOD THEREOF, AND RECORDING MEDIUM STORING COMPUTER PROGRAM

BACKGROUND OF THE INVENTION

1. Field of the Invention

The present invention relates to an information transmission apparatus that transmits information of its own device to an external apparatus, a method of controlling the information transmission apparatus, and a recording medium that stores a computer program.

2. Description of the Related Art

Conventionally, an image processing apparatus having a function of a web server has been known. The image processing apparatus generates a web page of information about a job status of the image processing apparatus and image data stored in a storage unit provided in the image processing apparatus. By transmitting the information to a client personal computer (PC) connected via a network, the information can be browsed on a web browser of the client PC (see, for example, Japanese Patent Application Laid-Open No. 2002-007095). Hereinafter, the web page is referred to as a remote user interface (UI). By browsing the remote UI, the user can grasp the information about the job being performed in the image processing apparatus and the information about the image data from a place away from the image processing apparatus.

Meanwhile, in the image processing apparatus, on a display part on an accompanying operation panel (hereinafter, referred to as local UI), the job status of the image processing apparatus or the information about the stored image data is displayed. When an error such as a jam occurs in the image processing apparatus, steps for solving the error are displayed on the display part with image transition in conjunction with the error solution operation of the user.

FIGS. 3A to 3D illustrate screens indicating the jam error solution steps displayed on the display part on the local UI. First, on the display part on the local UI, the screen illustrated in FIG. 3A indicating a first error solution step is displayed. Next, if the user performs an operation (an error solution operation) of the image processing apparatus according to the displayed solution step, the screen illustrated in FIG. 3B is displayed on the display part on the local UI such that a next step is indicated. In this way, in conjunction with the error solution operation of the user, the screens of the error solution steps displayed on the display part on the local UI are sequentially changed from FIG. 3A to FIG. 3D.

As mentioned above, conventionally, as the method of visually recognizing the information about the image processing apparatus such as the information about the job status and the stored image data by the user, the local UI and the remote UI are provided. However, the conventional remote UI is provided by a web server in the image processing apparatus by generating a dedicated screen for the remote UI and supplying the screen to the browser. Accordingly, from the remote UI, the user can see neither a common screen with the screen displayed on the display part of the image processing apparatus nor the screen transition itself such as the error solution steps displayed on the display part of the image processing apparatus when the error occurred. Further, since the user cannot recognize the screen itself currently being displayed on the display part of the image processing apparatus, it is difficult to grasp the status of the image processing apparatus, for example, whether the error solution operation was adequately performed.

As described above, since the conventional remote UI is not intended to display the common screen with the screen displayed on the local UI, demand of users who want to see the common screen with the screen displayed on the local UI has not been satisfied, and there is room for improvement.

SUMMARY OF THE INVENTION

According to an aspect of the present invention, an information transmission apparatus includes a generation unit configured to generate a web page showing information of the information transmission apparatus and containing image data indicating a common screen with a screen to be displayed on a display unit provided in the information transmission apparatus, a transmission unit configured to transmit the web page generated by the generation unit to an information processing apparatus in response to a request from the information processing apparatus, and an acquisition unit configured to acquire image data of each of a plurality of relevant screens in a case where the screen to be displayed on the display unit is one of the relevant screens. The generation unit generates the web page containing the image data of each of the screens acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is an example of a display of a web page transmitted from the image processing apparatus displayed on a web browser according to an exemplary embodiment.

DESCRIPTION OF THE EMBODIMENTS

Various exemplary embodiments, features, and aspects of the invention will be described in detail below with reference to the drawings.

Figure 1:
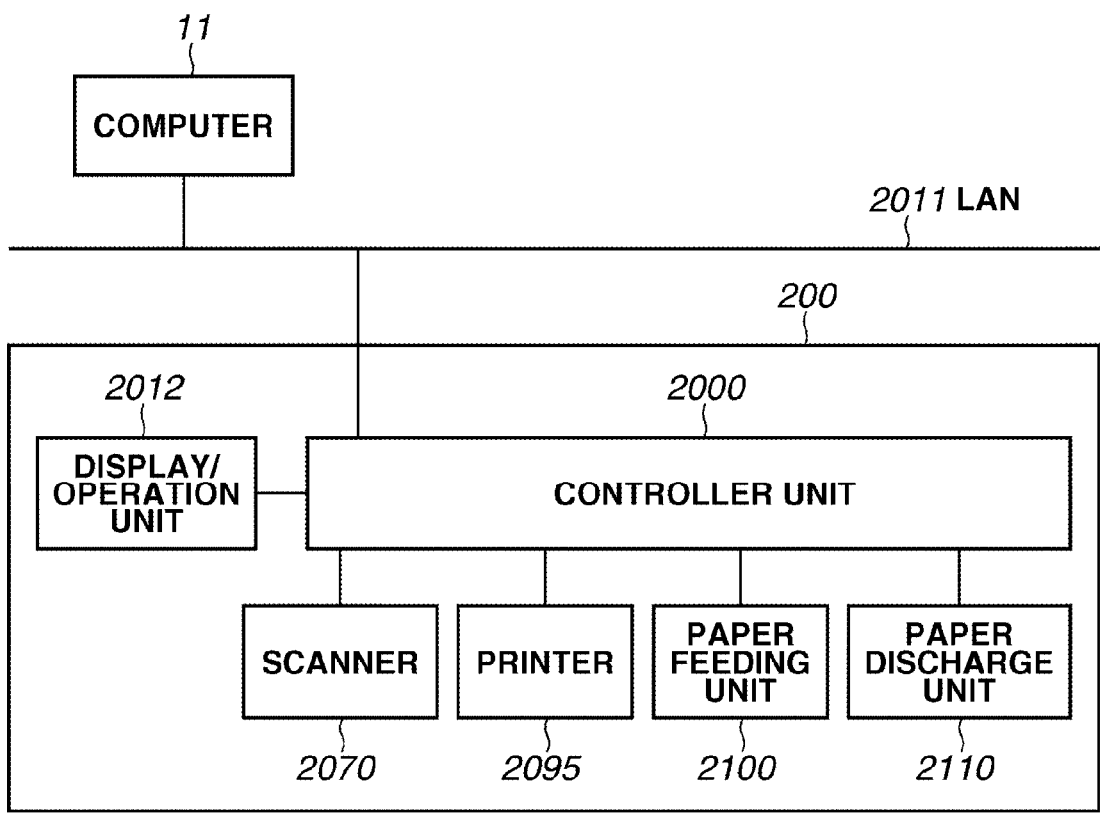
FIG. 1 illustrates a system configuration according to an exemplary embodiment of the present invention.

FIG. 1 illustrates a system configuration according to a first exemplary embodiment that is an example to which the present invention is applied.

In FIG. 1, an image processing apparatus 200 includes a scanner unit 2070, a printer unit 2095, a control unit (Controller Unit) 2000, and a display/operation unit 2012 that serves as a local UI.

Each of the scanner unit 2070, the printer unit 2095, a paper feeding unit 2100, a paper discharge unit 2110, and the display/operation unit 2012 are connected to the control unit 2000. The control unit 2000 is connected to a network transmission means such as a local area network (LAN) 2011.

The control unit (Controller Unit) 2000 is connected to the scanner unit 2070 that serves as an image input device and the printer unit 2095 that serves as an image output device. Further, the control unit 2000 is connected to the paper feeding unit 2100 that feeds paper, or the like and the paper discharge unit 2110 that discharges printed paper. The paper feeding unit 2100 includes a plurality of paper feeding stages and inserters (not shown). The paper discharge unit 2110 includes options such as a finisher having a plurality of discharge bins, a finisher having a bookbinding function, and the like.

The display/operation unit 2012, which serves as the local UI, has a display unit for displaying a state of the apparatus body, information of a job, or the like as an operation interface with a user. The display unit includes a touch panel function. Further, the display unit includes a light-emitting diode (LED) that indicates status of the image processing apparatus 200, a hard key, a button key, and the like. The user can see an error status of the image processing apparatus, or the like from the information displayed on the display/operation unit 2012. Further, the user can operate the image processing apparatus 200 by pressing an operation menu button displayed on the display/operation unit 2012 using the touch panel or pressing the hard key button. In the exemplary embodiment, the image processing apparatus 200 operates as an information transmission apparatus that transmits requested information in response to a request from a client PC to the client PC. As long as the information transmission apparatus has the function for transmitting the requested information, the information transmission apparatus is not limited to the image processing apparatus such as a printer, a scanner, a copying machine, and a fax machine, but the information transmission apparatus can be the other apparatuses.

A computer 11 includes a display apparatus, a keyboard, a pointing device, and a computer body (not shown). Further, the computer 11 includes a function of loading an operating system from a built-in storage device in the computer body onto a random access memory (RAM), and performing various application programs. Further, the computer 11 can communicate with the image processing apparatus 200 via a network using a network interface (not shown), and can display information acquired by the communication on the display device. The storage device stores a so-called web browser. The computer 11 is configured such that the web browser can operate on the computer 11. By the web browser, the computer 11 can communicate with the image processing apparatus 200 that can operate as a web server (described below) using a predetermined protocol, and can display a remote UI on the display device. The computer 11 operates as an information processing apparatus that is a client PC for making a request of information to the information transmission apparatus and displaying the acquired information. In the exemplary embodiment, as an example of the image processing apparatus, the case of the computer 11 is described, however, the other terminals such as a cell phone can be employed.

In FIG. 1, the image processing apparatus 200 and the computer 11 are communicatably interconnected via the LAN 2011. In the system, if a request for acquiring information is transmitted from the web browser provided in the computer 11 to the image processing apparatus 200, the image processing apparatus 200 transmits the requested information to the computer 11. The connection configuration of the image processing apparatus 200 and the computer 11 is not limited to the LAN, but the Internet, wireless communication, and the other connection methods can be employed to implement the system. In FIG. 1, only the computer 11 and the image processing apparatus 200 are connected to the LAN 2011, however, the other terminals can also be connected.

Figure 2:
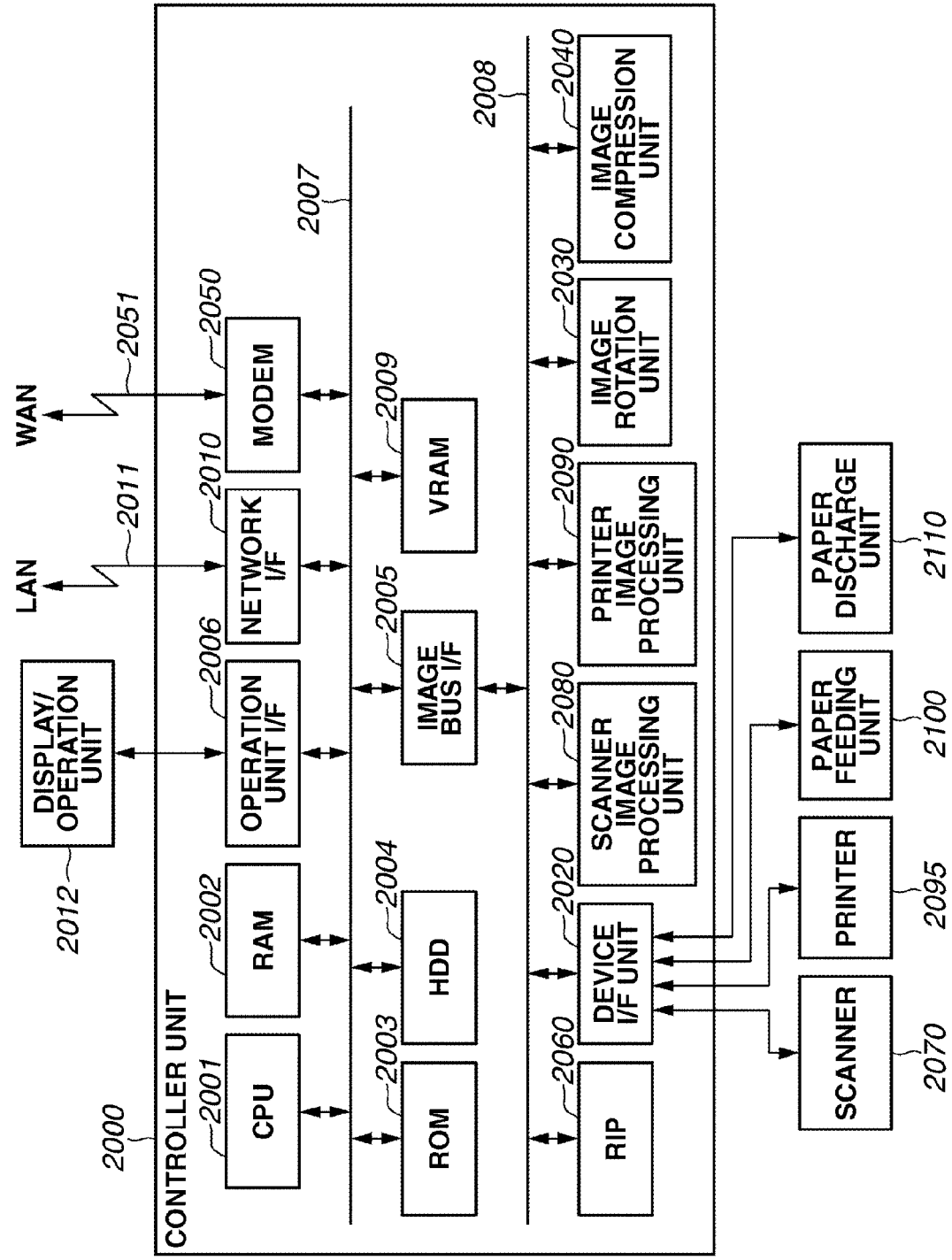
FIG. 2 is a block diagram illustrating a configuration of a control unit in an image processing apparatus according to the exemplary embodiment.
Figure 3A:
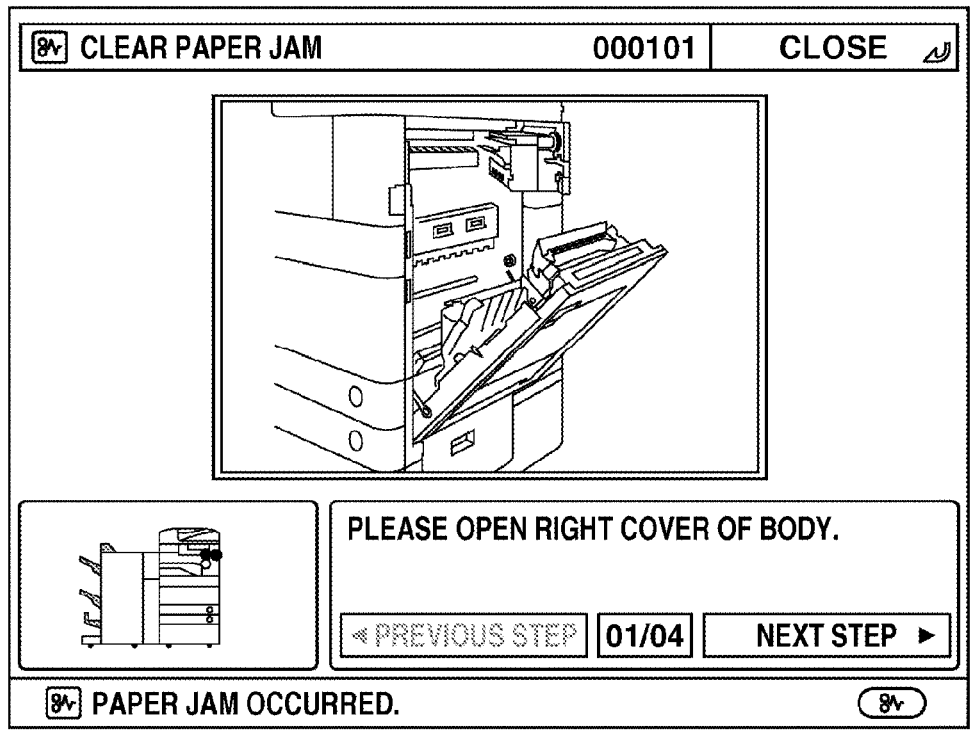
FIGS. 3A, 3B, 3C, and 3D illustrate examples of screens displayed on a display unit in the image processing apparatus according to the exemplary embodiment.
Figure 3B:
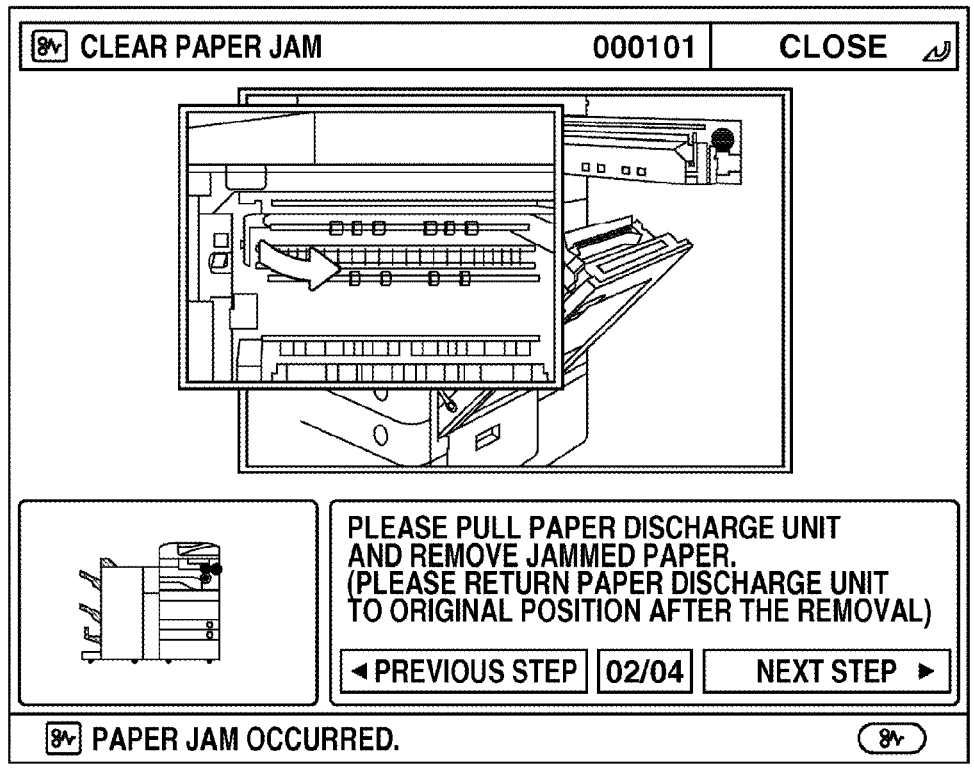
Figure 3C:
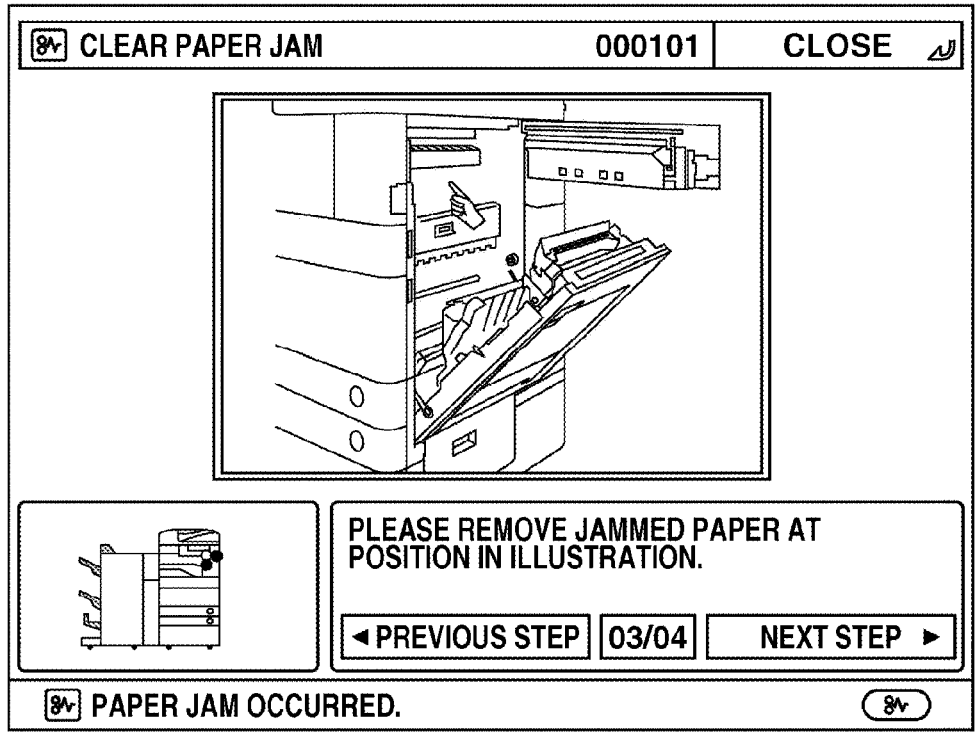
Figure 3D:
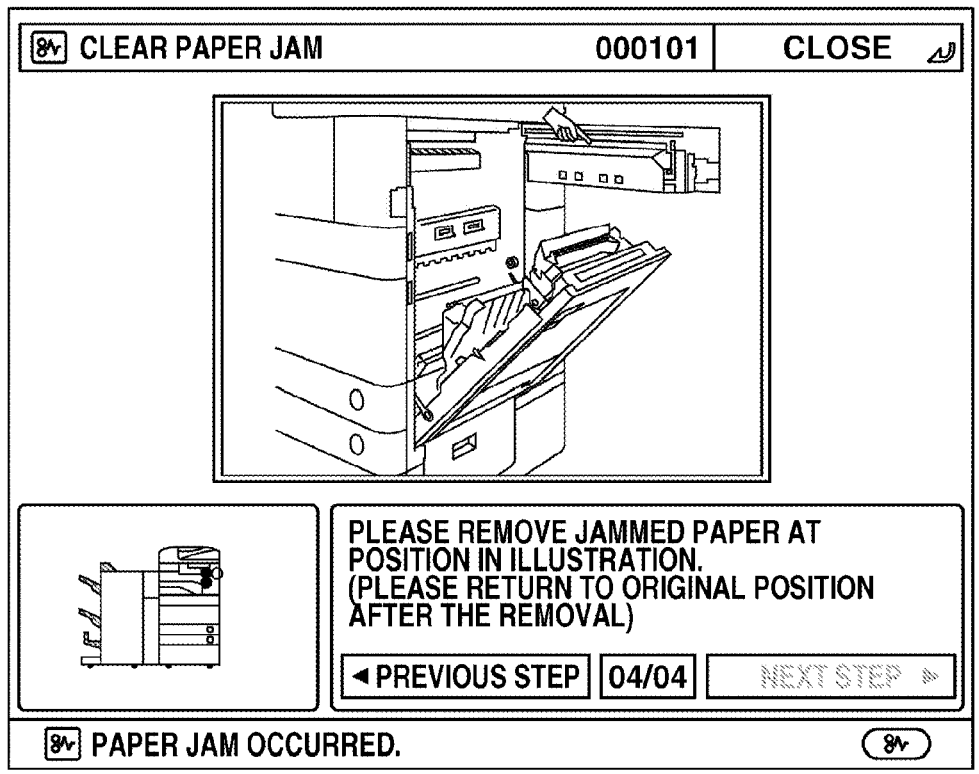

FIG. 2 is a block diagram illustrating a detailed hardware configuration of the control unit 2000 illustrated in FIG. 1. To components similar to those in FIG. 1, the same reference numerals are applied.

In FIG. 2, a central processing unit (CPU) 2001 is a controller for controlling the whole system. The CPU 2001 controls overall operation of access to various devices connected to a system bus 2007 according to a control program, or the like stored in a program read-only memory (ROM) 2003 and a hard disk drive (HDD) 2004. Further, by giving instructions to various devices, the CPU 2001 performs print processing or processing for generating display screen data to be displayed on the display/operation unit 2012. Further, the CPU 2001 generates a web page to be displayed on a remote UI (described below) according to a common gateway interface (CGI) program (described below). Further, the CPU 2001 reads input information from the scanner unit 2070 connected via a device interface 2020. Further, the CPU 2001 outputs an image signal as output information to the printer unit 2095 connected via the device interface 2020.

Figure 6:
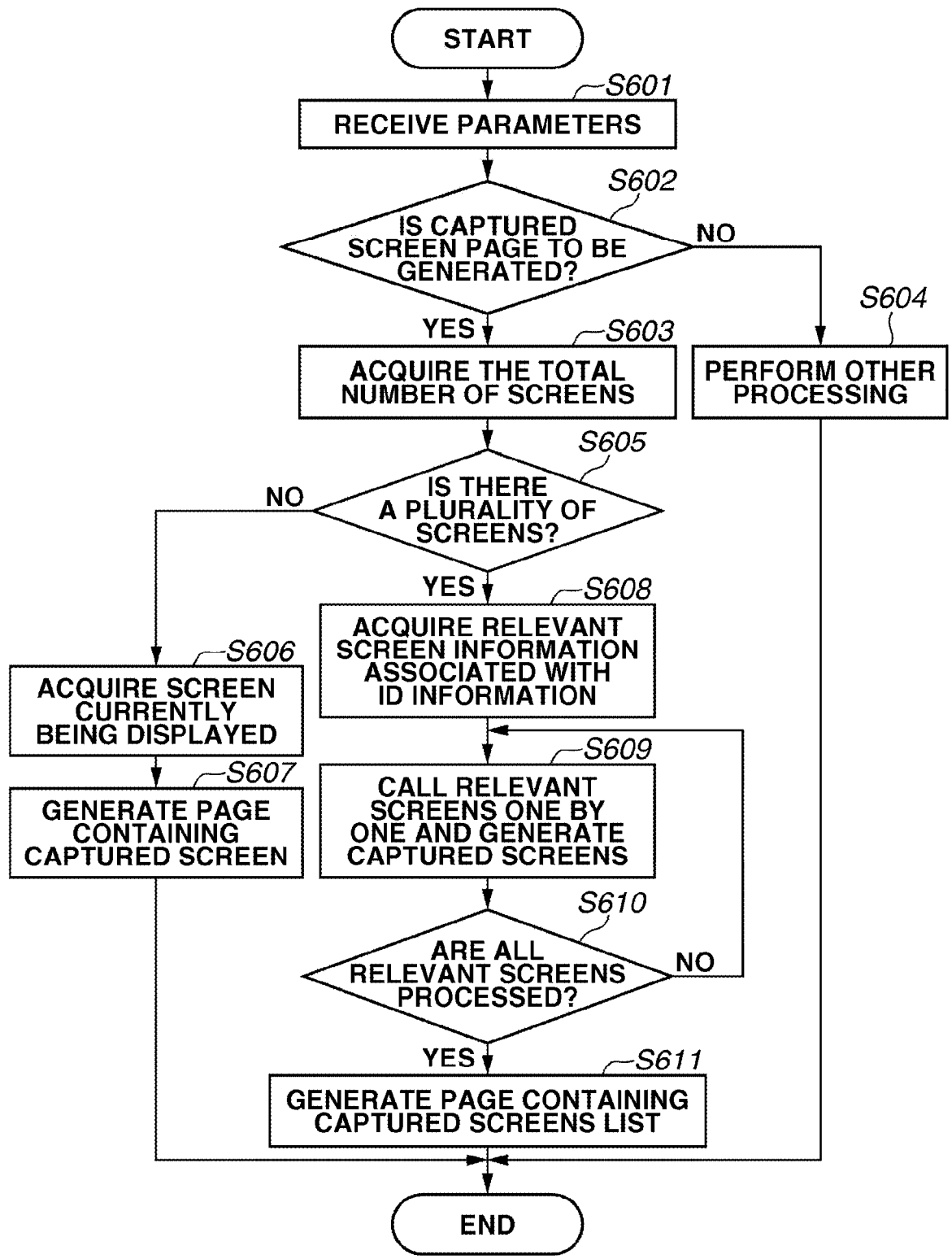
FIG. 6 is a flowchart illustrating the processing procedure of the Common Gateway Interface (CGI) program processing in step S509 in FIG. 5.

A ROM 2003 stores a control program, and a software module, for example, a CGI program corresponding to a flowchart illustrated in FIG. 6. According to the CGI program, processing or calculation of various types of information, control of various devices, or the like is performed, and a web page to be displayed on the remote UI is generated. The ROM 2003 also stores a boot program of the system, and serves as a boot ROM.

A RAM 2002 serves as a system work memory for the CPU 2001 to operate, and also serves as a memory for temporarily storing image data, a screen information table (described below), or the like.

The HDD 2004 stores image data or message data of display data that is to be a resource to be displayed on the display/operation unit 2012, system software, and the like. The HDD 2004 also stores a resource file, a template file, and the like for generating a web page (described below).

Further, in the storage devices such as the HDD 2004 in the image processing apparatus, a screen information table that defines screen information is stored. An example of the screen information table is described with reference to FIG. 7. The screen information table is loaded in the RAM 2002 in each step in FIG. 6 (described below), or as needed, and then, the CPU 2001 can refer to the table.

Figure 7:
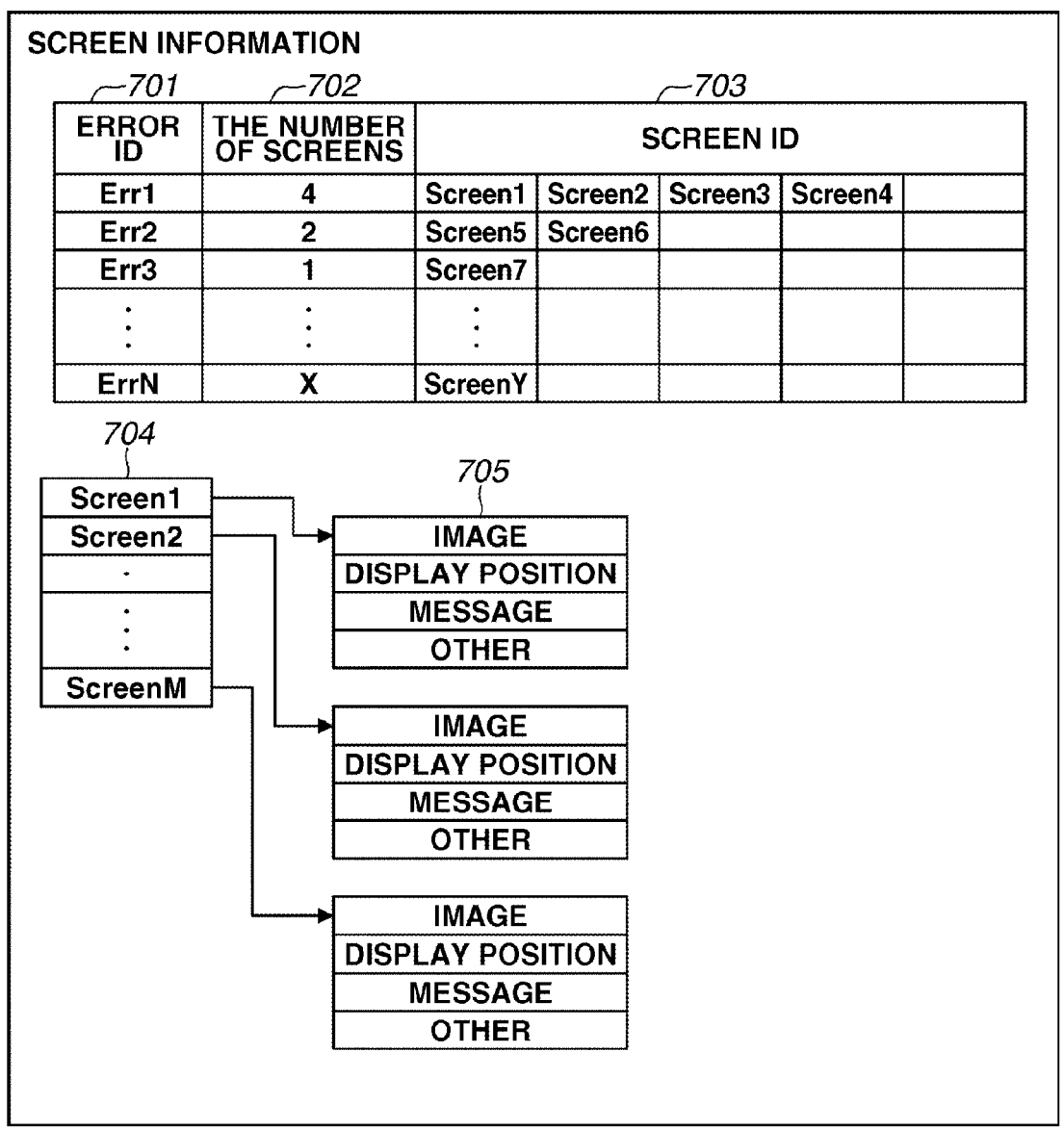
FIG. 7 is an example of a screen information table stored in the image processing apparatus according to the exemplary embodiment.

An item 701 in FIG. 7 illustrates a list of error IDs. An item 702 illustrates the number of error screens associated with each error ID. Further, an item 703 stores the IDs of actually associated screens, whose number is the same as the number of screens 702. For example, in a case where the error ID is Err1, the number of screens associated with the error ID is four, and the screen IDs corresponding to the error ID are Screen1, Screen2, Screen3, and Screen4. An item 704 is a list of each screen ID. An item 705 is information about display contents necessary for displaying the above-described each screen ID, for example, image data, positional information, a message content, and the other information that are to be resources. Accordingly, the display contents corresponding to each screen ID described in the item 703 can be referred to by tracing from the item 704 to the item 705. As described above, the screen information table defines a series of screen transitions to be screen-transitioned and displayed on the display/operation unit 2012.

An operation unit I/F 2006 serves as an interface unit with the display/operation unit 2012, and plays a role to transmit information input by a user of the system using the menu button displayed on the touch panel, the hard key, or the like included in the display/operation unit 2012 to the CPU 2001.

Further, the operation unit I/F 2006 receives user input from the hard key, the touch panel, or the like included in the display/operation unit 2012, and acquires the operation contents.

Using the operation contents acquired from the operation unit I/F 2006 and the above-described control program, the CPU 2001 generates display screen data for a screen to be displayed on the display/operation unit 2012. The display screen data is stored in a video random access memory (VRAM) 2009. The display screen data stored in the VRAM 2009 is output as a display screen on the display/operation unit 2012 via the operation unit I/F 2006.

The VRAM 2009 serves as a memory for storing the display screen data generated in the CPU 2001. The CPU 2001 uses the display data acquired from the HDD 2004 to generate a screen to be displayed on the display/operation unit 2012. The VRAM 2009 is the memory for storing the image data arranged to be displayed on the display/operation unit 2012.

A network interface (network I/F) 2010 is connected to the LAN 2011, and performs input and output of information. A modem (Modem) 2050 is connected to a public line 2051, and performs input and output of information. The image processing apparatus 200 performs input and output of image information or device information to/from an external device by being connected to the LAN 2011 via the network I/F 2010 or the public line (WAN) 2051 via the modem 2050. The above-described devices are arranged on the system bus 2007.

An image bus I/F (Image Bus I/F) 2005 connects the system bus 2007 and an image bus 2008 that transfers image data at a high speed, and serves as a bus bridge for converting a data structure.

The image bus 2008 is a PCI bus or an IEEE1394 interface. On the image bus 2008, the following devices are arranged.

A raster image processor (RIP) 2060 rasterizes a PDL code into a bitmapped image.

A device I/F unit 2020 connects the scanner unit 2070 and the printer unit 2095, which are image input/output devices of each device in the apparatus, and the control unit 2000, and performs identification of a status of each device and synchronous/non-synchronous conversion of image data. Further, the device I/F unit 2020 is connected to the paper feeding unit 2100 that performs paper feeding and the paper discharge unit 2110 that performs discharge of printed sheet. The device I/F unit 2020 performs, in addition to identification or detection of a state or a status of the paper feeding or the paper discharge, identification or detection of error information of connected devices or remaining amounts of consumable supplies.

A scanner image processing unit 2080 performs correction, processing, and editing on input image data. A printer image processing unit 2090 performs correction of a printer, resolution conversion, or the like on print output image data.

An image rotation unit 2030 performs rotation processing of image data. An image compression unit 2040 performs compression/decompression processing of Joint Photographic Experts Group (JPEG) on multivalued image data, and performs compression/decompression processing of Joint Bi-level Image Experts Group (JBIG), Modified Modified READ (MMR), Modified Huffman (MH), or the like on binary image data.

Figure 4:
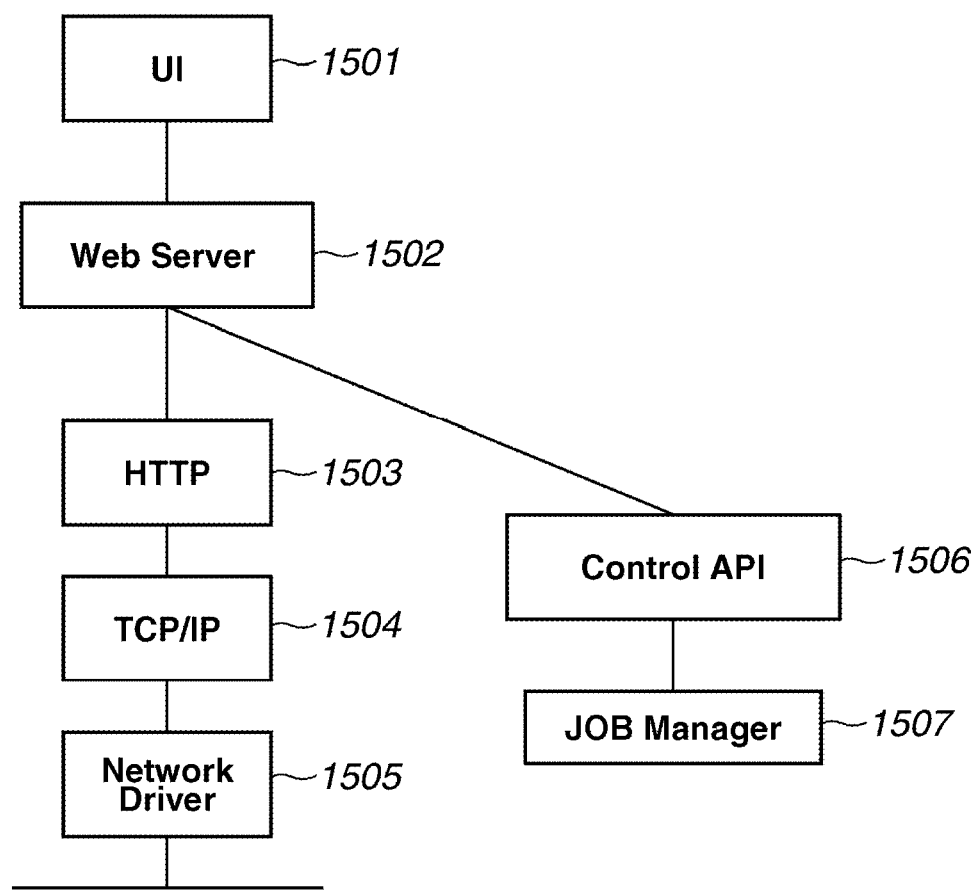
FIG. 4 illustrates a configuration of a software module in the image processing apparatus according to the exemplary embodiment.

With reference to the block diagram in FIG. 4, various software modules recorded in the ROM 2003 or the HDD 2004 in the image processing apparatus, loaded in the RAM 2002 as needed, and implemented by the CPU 2001 are described.

In FIG. 4, a module 1501 controls a user interface (UI), and intermediates between the image processing apparatus and a device when an operator performs various operations and settings to the image processing apparatus using the display/operation unit 2012 in the image processing apparatus. According to the operation of the operator, the module transfers input information to each module described below via the operation unit I/F 2006, and performs a request of processing or setting of data.

A web-server module 1502 is used to generate display data for enabling display of information on a web client in response to a request from the web client connected to the LAN 2011. Further, the web-server module 1502 is used to notify information about the image processing apparatus such as management information for performing multi-function image processing, a job status, or the like. Notification of the above-mentioned request from the web client is transmitted to the image processing apparatus via the network I/F 2010. Meanwhile, the management information of the image processing apparatus is read via a Control-API 1506 (described below). Then, notification of the information is transmitted to the web client connected to the image processing apparatus via a HTTP 1503, a TCP/IP 1504, and a Network Driver 1505 (described below) and the network I/F 2010.

The web-server module 1502 generates so-called web page format data using a CGI program (described below), or the like. The generated web page format data is display data for enabling display of an object including an image or of information such as texts on the web client, for example, data in HTML format. By the web-server module 1502, the image processing apparatus operates as an information transmission apparatus that can transmit and provide information to an image processing apparatus that is a client.

A Hypertext Transfer Protocol (HTTP) module 1503 is used in communication by the multifunction image processing apparatus using HTTP. The HTTP module 1503 provides communication for the above-mentioned web-server module 1502 with a Transmission Control Protocol/Internet Protocol (TCP/IP) module 1504 (described below).

The TCP/IP communication module (TCP/IP module) 1504 provides network communication for the above-mentioned each module with the Network Driver (described below). The Network Driver 1505 controls the network I/F 2010 that is physically connected to a network.

The Control-API 1506 provides an upstream module with an interface with a downstream module. By the Control-API 1506, the dependency relationship between the upstream and the downstream modules is reduced, and each diversion can be increased.

A Job-Manager module 1507 interprets processing instructed from the above-described various modules via the Control-API 1506, and gives an instruction to each module. The module serves as a job control unit that centrally controls processing of the hardware performed in the multifunction image processing apparatus. In this case, the Job-Manager module 1507 can control information passing with the various processing units via the image bus I/F 2005 as needed.

The operation according to the exemplary embodiment by the above-described configurations is described with reference to the drawings. Especially, the remote UI that is a feature of the image processing apparatus according to the exemplary embodiment is described.

The remote UI has a function for providing a user interface for enabling operation such as acquisition, setting, printing, or transmission (Universal-Send) of information such as a status of the apparatus from the outside of the apparatus. In this context, the term "remote UI" can mean a display screen itself displayed on an external apparatus. The user can use the function of the remote UI by accessing the apparatus using a web browser from a computer connected to a network.

As illustrated in FIG. 4, in the apparatus, the web-server module 1502 is in operation, and by the web-server module 1502, communication by HTTP can be performed. In the web-server module 1502, a CGI program that is activated by a request from a client can operate.

In the HDD 2004 illustrated in FIG. 2, a resource file group and a page template file group are stored. The file groups are used in the remote UI. The resource files include an HTML file to be used for page display and an image file. The file is not limited to the HTML file, but other files of display data for expressing a screen showing information about resources and described in the other languages can be employed. The template files are referred to from the CGI program and used to generate a page.

In order to access the apparatus, the user directly input an Uniform Resource Locator (URL) on the web browser or selects a link in which the URL is embedded. The web browser transmits an HTTP command for specifying the URL input by the operator via the network.

The web-server module 1502 receives the HTTP command, analyzes the HTTP command, and performs operation corresponding to the command. The operation includes, for example, according to the request of the HTTP command, an instruction of setting, acquisition, and print out of information of the image processing apparatus to the body. Further, by the above-described template file, the web-server module 1502 generates a web page corresponding to the request, and transmits the web page to the web browser of the client.

The web browser displays the web page returned from the image processing apparatus. In this way, the user operating the computer uses the web browser to access the apparatus, and can acquire and set the information of the functions, status, and storage of the image processing apparatus. Further, the user can operate the image processing apparatus. Since the display data of the remote UI is provided by the HTML data, the computer is not required to have dedicated software for displaying the remote UI, and general-purpose software such as the web browser is simply to be provided.

The basic operation of the remote UI is further described with reference to FIG. 5.

Figure 5:
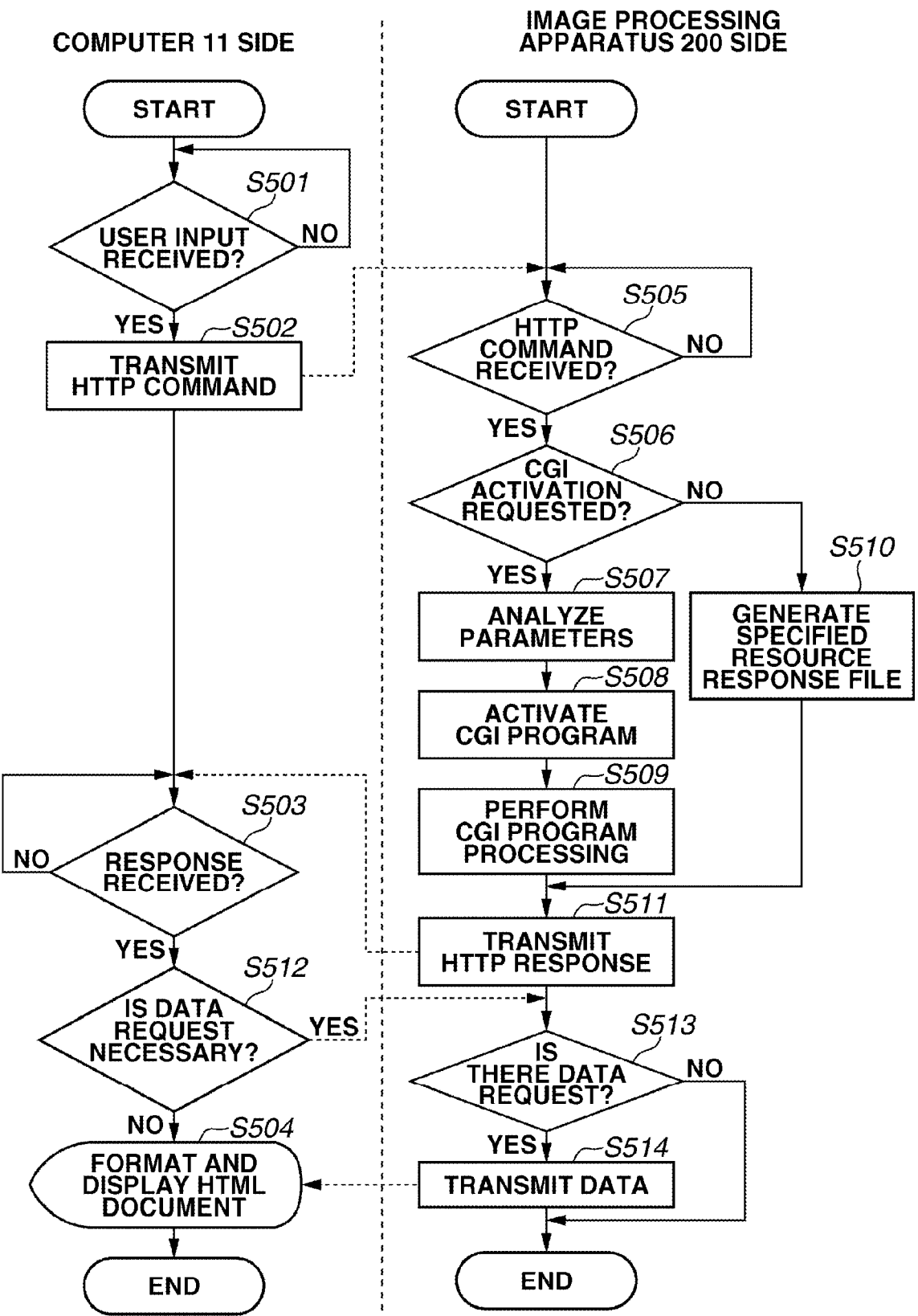
FIG. 5 is a flowchart illustrating an example of a data processing procedure performed between a computer and the image processing apparatus according to the exemplary embodiment.

FIG. 5 is a flowchart illustrating an example of a data processing procedure between the computer 11 that is a side of the web client (browser) and the image processing apparatus 200 that is a side of the web server according to the exemplary embodiment.

Processing in steps S501 to S504 and S512 is processing to be performed in the computer 11, and processing in steps S505 to S511 and steps S513 and S514 is processing to be performed in the image processing apparatus 200. The arrows of the dashed lines in the flowchart illustrate transmission and reception of information. Each step in steps S501 to S514 is performed by the CPU provided in the computer 11 or the image processing apparatus 200 by extracting a program stored in a memory such as the ROM onto the RAM and implementing the program.

First, the processing in the computer 11 side is described. The flow of the computer 11 starts from a step of receiving input of a user by the web browser. In step S501, the computer 11 waits for input of a URL from a user. If a URL is input (YES in step S501), the processing proceeds to step S502. In step S502, the computer 11 that is implementing the web browser transmits an HTTP command specifying the input URL to the image processing apparatus 200 via a communication path such as the LAN 2011. The HTTP command is for requesting HTML data corresponding to the input URL. In step S501, if there is no input (NO in step S501), in step S501, the computer 11 waits for reception of input again.

In step S503, the computer 11 waits for reception of an HTTP response to receive a response from the image processing apparatus 200. The HTTP response contains the HTML data corresponding to the URL specified by the HTTP command in step S502. In step S503, if the computer 11 receives the HTTP response (YES in step S503), the web browser interprets the HTML data contained in the HTTP response. By determining whether a link to image data or the like is contained, the web browser determines whether a request of data is necessary when formatting and displaying an HTML document. If the web browser determines that the request of data is necessary in formatting and displaying the HTML document, in step S512, the web browser requests the data such as image data to the image processing apparatus 200 side. After the necessary data is acquired, the processing proceeds to step S504, and the web browser formats and displays the HTML document. Then, the one session ends. In formatting and displaying the HTML document received in step S503, if the linked image data or the like is not contained and the request of the data is not necessary (NO in step S512), the processing in step S512 is omitted, and the processing proceeds to step S504.

In the image processing apparatus 200, the processing starts from processing of waiting for an HTTP command from the computer 11. In step S505, if the CPU 2001 determines that an HTTP command is received via the network I/F 2010 (YES in step S505), the processing proceeds to step S506.

In step S506, the CPU 2001 determines whether the request from the web browser is a CGI program activation request. If the request is the CGI program activation request (YES in step S506), in step S507, the CPU 2001 analyzes the CGI parameters, and determines a CGI program to be processed. Then, the CPU 2001 stores the parameters in the RAM 2002. The processing proceeds to step S508, and the CPU 2001 activates the corresponding CGI program.

In step S509, the CPU 2001 performs processing of the CGI program. In step S511, the CPU 2001 transmits the result of the processing in step S509 as an HTTP response to the computer 11. The HTTP response contains HTML data generated by processing of the CGI program, whose processing is described below.

In step S513, the CPU 2001 determines whether a request of data is transmitted from the computer 11 via the network I/F 2010. In step S513, if the CPU 2001 determines that the request of data is transmitted from the computer 11 (YES in step S513), in step S514, the CPU 2001 transmits the requested data, and the one session ends. In step S513, if the CPU 2001 determines that the request of data is not transmitted from the computer 11 (NO in step S513), similarly, the one session ends. The reception of the data request in step S513 and the transmission of the data in step S514 can be performed a plurality of times.

In response to the request from the computer 11, the CGI program in step S508 makes a request of operation such as acquisition and setting of apparatus information or print output to the body (in this case, the JOB Manager 1507). Further, the CGI program generates an HTML page to be transmitted using a template file corresponding to the page. The template file contains a part for changing a description using the acquired information, and this enables generation of a page content corresponding to the state of the time. An instruction for generating an image necessary for the generation of the page content is also performed in the CGI program.

Meanwhile, in step S506, if the request is not the CGI program activation request (NO in step S506), in step S510, the CPU 2001 returns a specified resource file as a response, and the one session ends.

The processing procedure of the CGI program processing in step S509 in FIG. 5 according to the exemplary embodiment is described with reference to the flowchart in FIG. 6. Each step in FIG. 6 is performed by the CPU provided in the image processing apparatus 200 by extracting a program stored in the memory such as the ROM onto the RAM and implementing the program.

In step S601, the CPU 2001 receives the parameters analyzed in step S507 in FIG. 5. Then, the processing proceeds to step S602. In step S602, the CPU 2001 determines whether generation of a web page containing a captured screen of the local UI is necessary using the parameters or the apparatus information.

In the exemplary embodiment, an error screen displayed on the display/operation unit 2012 that serves as the local UI can be captured as the captured screen. The parameters can contain error ID information. In such a case, the computer 11 transmits the HTTP request including the error ID information to be acquired to the image processing apparatus 200. The CPU 2001 acquires the error ID information from the parameters, and specifies screen transition to be displayed on the computer 11 from screen transition defined by the error ID information using the screen information table in FIG. 7.

The error ID information indicates an error currently occurring in the image processing apparatus 200. Accordingly, using the error information indicating the status of the apparatus acquired from the device I/F unit 2020, the CPU 2001 can determine and select the screen transition. In the processing, the error ID is recorded in the RAM 2002, or the like. The error ID that is necessary in steps described below is acquired from the RAM 2002 together with the parameters in step S601. The CPU 2001 acquires the error ID information from the RAM 2002, refers to the screen information table in FIG. 7, and specifies screen transition to be displayed from the screen transition defined by the error ID information.

In step S602, if the CPU 2001 determines that the generation of the web page containing the captured screen of the local UI is not necessary (NO in step S602), the processing proceeds to step S604. In step S604, processing corresponding to the parameters or the apparatus information is performed. For example, if there is no error in the image processing apparatus 200, the generation of the web page containing the captured screen of the local UI is not necessary so that the CPU 2001 generates HTML data of a web page that indicates that there is no error, and the processing ends.

As described above, using the corresponding parameters or the apparatus information, it is determined as to whether the generation of the web page containing the captured screen of the local UI is necessary. Accordingly, only in the case where there is a user's request or there is necessity for showing the user the captured screen, the generation of the web page containing the captured screen of the local UI can be performed. Therefore, the more user-friendly remote UI can be provided.

In step S602, if it is determined that the generation of the web page containing the captured screen of the local UI is necessary (YES in step S602), the processing proceeds to step S603. In step S603, the CPU 2001 loads the screen information table in FIG. 7 stored in the HDD 2004 onto the RAM 2009, and acquires the total number of screens related to the specified error ID. The screens relating to the specified error ID can be screens sequentially indicating error solution operation steps defined by the error ID.

In step S605, the CPU 2001 determines whether the number of screens acquired in step S603 is a plural number. That is, whether the screen currently being displayed on the local UI is one of the relevant screens or not is determined. In step S605, if the number of screens is a single number (one) (NO in step S605), the processing proceeds to step S606. In step S606, the CPU 2001 captures the screen currently being displayed on the display/operation unit 2012. The screen currently being displayed is actually being loaded in the VRAM 2009, and the CPU 2001 acquires the display screen data stored in the VRAM 2009. Then, the processing proceeds to step S607. In step S607, the CPU 2001 generates HTML data containing a link to the captured image. It is possible to consider that the screen currently being displayed on the local UI indicates current error information or the error solution step in the image processing apparatus 200.

In step S605, if the number of screens indicating the error solution steps corresponding to the error ID is more than one (YES in step S605), that is, if it is determined that the screen currently being displayed is one of the relevant screens, the processing proceeds to step S608. In step S608, the CPU 2001 acquires information of a series of screens associated with the current error information (error ID) from the screen information table in FIG. 7, the table being described below. Then, the processing proceeds to step S609. In step S609, the CPU 2001 calls image data or the like one by one as resources of the relevant screens defined by the error ID from the HDD 2004, and generates a captured screen. More specifically, the CPU 2001 loads the called image data or message data onto the VRAM 2009, processes the data according to the screen information acquired from the screen information table, and generates display screen data in a format to be displayed on the display/operation unit 2012. Then, the CPU 2001 acquires the display screen data stored in the VRAM 2009 and stores the data in the RAM 2002 or the HDD 2004. Alternatively, the image data or message data can be directly loaded onto the RAM 2002, not onto the VRAM 2009, and the data can be acquired and stored. As described above, by calling a series of screen information associated with the error information (error ID) and performing the processing, the captured screen can be generated.

In step S610, the CPU 2001 determines whether the processing is performed to all of the screens of the number of screens determined in step S605. If the relevant screen still remains (NO in step S610), the processing returns to step S609. In step S609, the CPU 2001 similarly calls a next screen, and generates a captured screen.

In step S610, if all screens have been processed (YES in step S610), the processing proceeds to step S611. In step S611, the CPU 2001 generates a web page containing list images of the captured image data that is sequentially generated and stored in step S609. More specifically, the CPU 2001 generates the HTML data containing the link to the list image data of the captured screens.

By the above-described processing, the HTML data is generated according to the CGI program in step S509 in FIG. 5. The generated HTML data is transmitted to the computer 11 in step S511. If the computer 11 receives the response in step S503, if necessary, in step S512, the computer 11 makes a request of data specified by the link contained in the HTML data to the image processing apparatus 200. Then, the processing proceeds to step S504, and the computer 11 formats the HTML data, and displays the web page. The VRAM 2009 in the exemplary embodiment has a region for not only the image data to be actually displayed on the local UI, but the region for loading the screen data for capturing for the remote UI. The screen data for capturing is loaded in the region for capturing, and the screen data loaded in the region is not displayed on the local UI. The screen data loaded in the region for capturing is erased from the region if the phenomenon (for example, error state) corresponding to the screen data is solved.

Figure 8:
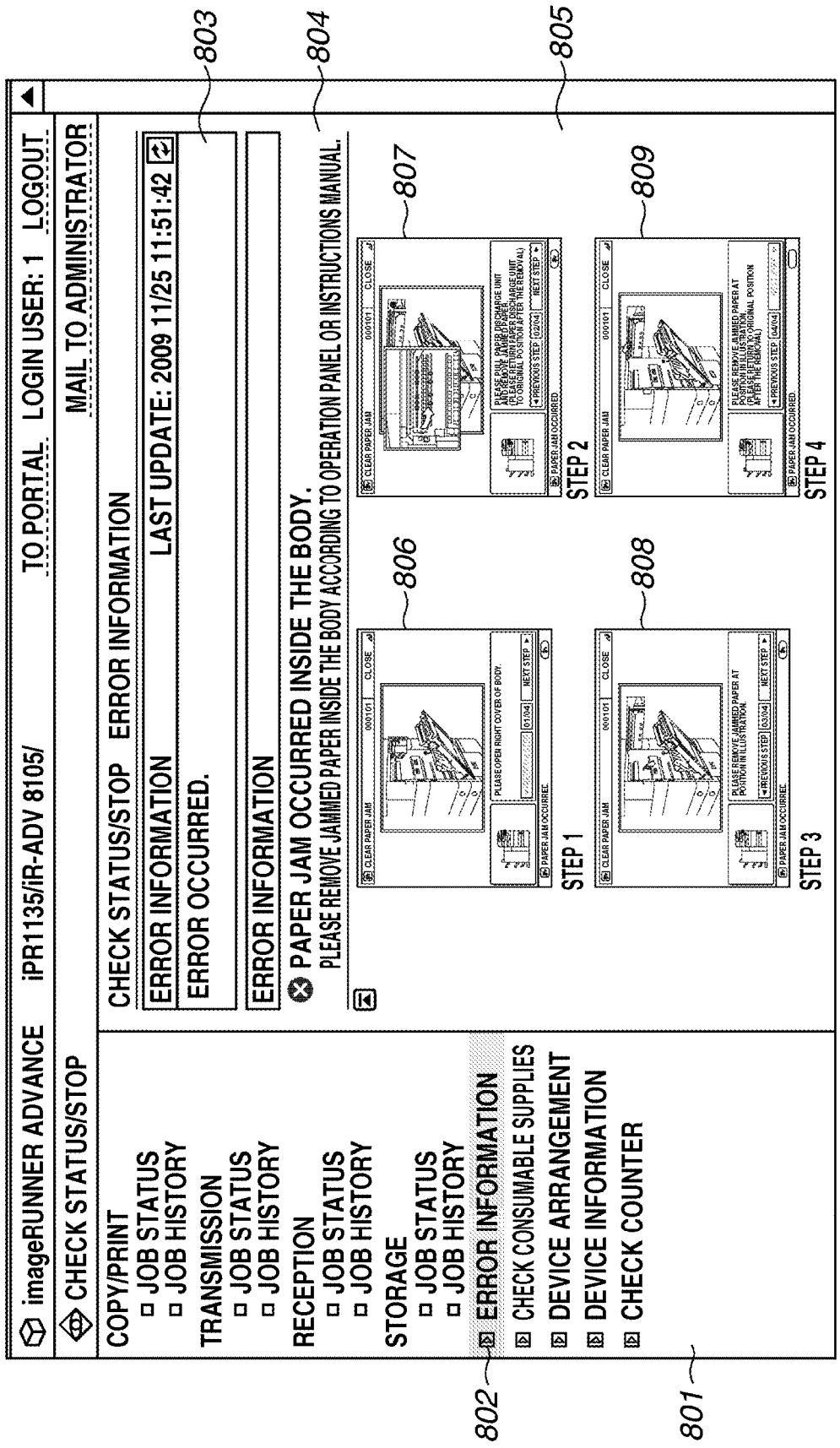
FIG. 8 is an example of a display of a web page transmitted from the image processing apparatus displayed on a web browser according to the exemplary embodiment.

FIG. 8 is an example of display of the web page transmitted from the image processing apparatus 200 on the web browser according to the exemplary embodiment. The screen is displayed on the display unit of the computer 11 by the web browser.

FIG. 8 illustrates an example of the page relating to the error information that can be browsed from the remote UI when the error occurred in the image processing apparatus 200. In an index area 801 in a top page of the remote UI, menu buttons that enable the user to instruct are provided. By pressing (clicking) an error information button 802, an HTTP commend is transmitted to the image processing apparatus 200 such that the error information page is displayed (in the above-described step S502). The image processing apparatus 200 that received the command performs, such that the request is satisfied, the CGI program processing described with reference to the above-described drawing, and transmits the HTML data describing the display contents in FIG. 8. In the main area, information 803 indicating that an error is occurring, and detailed error information 804 are displayed. Further, list images 805 of the captured screens of the local UI illustrating error solution step 1 to step 4 are displayed. The list images 805 of the captured screens include images 806, 807, 808, and 809 of the error solution steps 1 to 4.

In the exemplary embodiment, the list images 806, 807, 808, and 809 of the captured images can be generated as one image data. In such a case, in step S608, in calling the image data or the like as the resources of the relevant screens from the HDD one by one, the CPU 2001 can generate a screen of one image using the data, and store the generated image data in a storage device such as the HDD.

As described above, in the exemplary embodiment, the common screen with the screen displayed on the local UI of the image processing apparatus can be checked by the remote UI. Accordingly, from the computer located at a place away from the image processing apparatus, the screen currently being displayed on the image processing apparatus can be checked. Further, a series of screen transitions displayed on the local UI of the image processing apparatus can be displayed as the list on the computer by the remote UI. Accordingly, from the computer located at the place away from the image processing apparatus, the user can visually recognize the necessary information. For example, the list of the error solution steps displayed by the local UI of the image processing apparatus can be displayed on the computer. By the display, the user can check the error solution steps in advance. Further, the list of a series of screen transitions can be displayed in the list. Accordingly, the easy-to-understand information display can be provided for the user. The term "common" means not only completely identical, but also means something having slight difference but can be considered to be substantially the same.

Hereinafter, a second exemplary embodiment of the present invention is described. In the second exemplary embodiment, as compared to the first exemplary embodiment, a displaying method in displaying the captured screens in screen transition, which is displayed on the local UI, on the remote UI is different. In the first exemplary embodiment, the captured screens are displayed on the remote UI as the list images. However, in the second exemplary embodiment, to the remote UI, the screens of the local UI are displayed one by one, and in response to an instruction for displaying a next screen (or a previous screen) by operation of the remote UI by the user, a corresponding captured image is displayed. By the processing, the user can select a captured screen to be displayed from the captured screens used for a series of screen transitions.

In the second exemplary embodiment, only the processing illustrated in the flowchart in FIG. 6 is different from that in the first exemplary embodiment. Accordingly, descriptions of the other overlapping parts are omitted, and the different parts are to be described.

Figure 9:
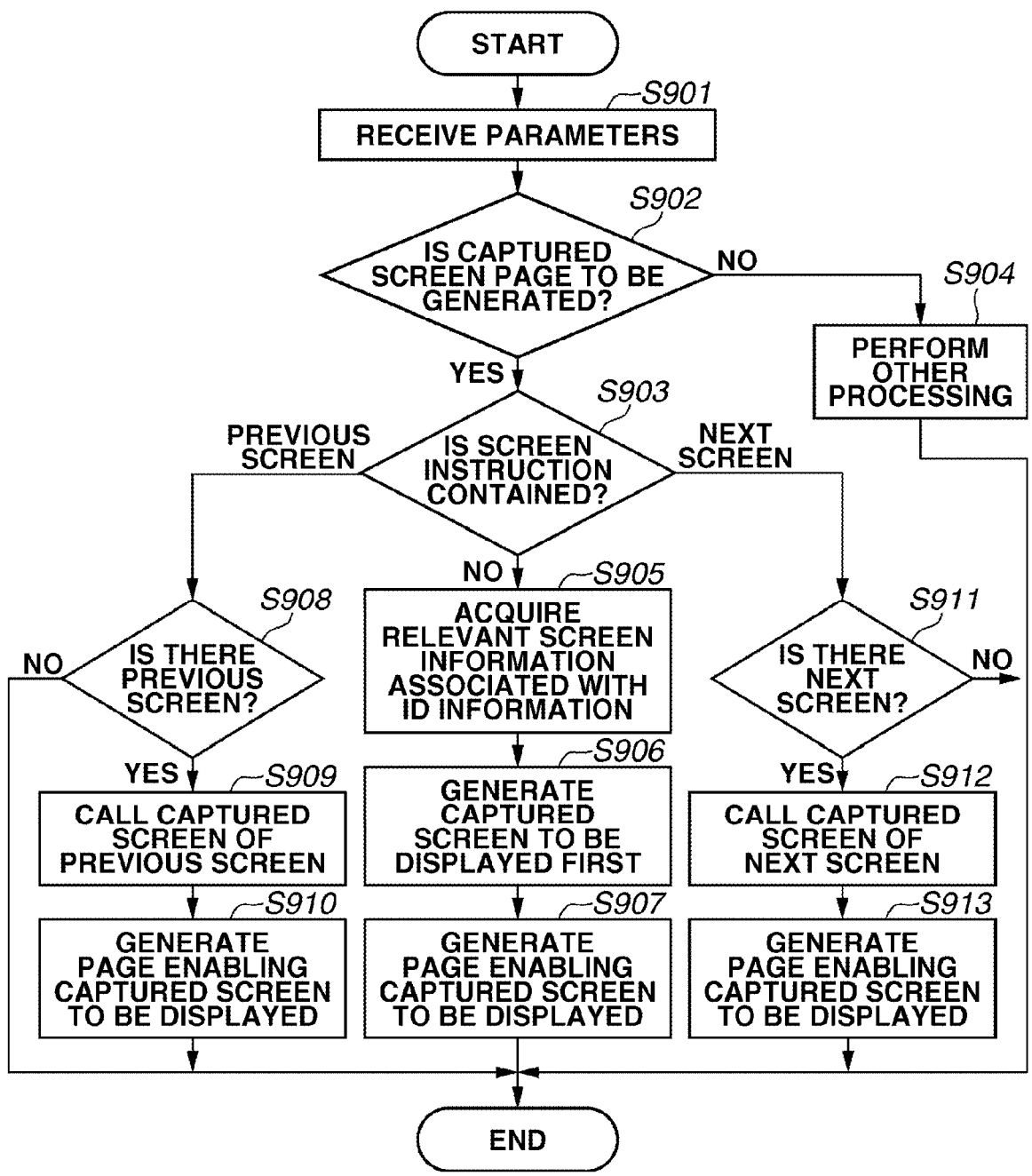
FIG. 9 is a flowchart illustrating the processing procedure of the CGI program processing in step S509 in FIG. 5.

With respect to the CGI program processing in step S509 in FIG. 5, processing performed in the second exemplary embodiment is described using the flowchart illustrated in FIG. 9. Each step in FIG. 6 is performed by the CPU provided in the image processing apparatus 200 by extracting the program stored in a memory such as the ROM onto the RAM and implementing the program.

In step S901, the CPU 2001 receives the parameters analyzed in step S507 in FIG. 5. In step S902, the CPU 2001 reads the parameters stored in the RAM 2002, and determines whether generation of a web page containing a captured screen of the local UI is necessary. Since the description of the error ID information is similar to that in FIG. 6, the description is omitted.

In step S902, if the CPU 2001 determines that the generation of the web page containing the captured screen of the local UI is not necessary (NO in step S902), the processing proceeds to step S904. In step S904, the CPU 2001 performs processing corresponding to the parameter contents. In the exemplary embodiment, the description of the processing is omitted. Then, the processing ends.

In step S902, if it is determined that the generation of the web page containing the captured screen of the local UI is necessary (YES in step S902), the processing proceeds to step S903. In step S903, the CPU 2001 determines whether the parameter contents contain a screen instruction request. In the processing, the parameters can include information indicating what number of screen ID is currently being displayed on the remote UI. In step S903, if it is determined that there is no screen instruction, the processing proceeds to step S905.

The fact that no screen instruction is included can be considered as a request of a first page of the display of the error solution steps. Then, in step S905, the fact that no screen instruction is included can be information for determination whether a next screen display instruction button (described below) is to be displayed on the remote UI.

In step S905, the CPU 2001 acquires the total number of screens to be captured and the other screen information from the screen information table in FIG. 7 stored in the HDD

2004. In step S906, the CPU 2001 performs capturing processing of the screen of the screen ID to be displayed first used for a series of screen transitions associated with the ID. In the step, captured screens of the other relevant screens used for the screen transition can also be generated, and stored in the RAM 2002 or the HDD 2004 in advance.

Then, the processing proceeds to step S907. In step S907, the CPU 2001 generates a web page containing the acquired captured screen of the screen to be displayed first. More specifically, the CPU 2001 generates HTML data containing a link to the data of the captured screen. In the processing, if the above-described screen information indicates that the total number of screens is a plural number, the HTML data is generated such that the next screen display instruction button (described below) is to be displayed, and the user can select the image to be displayed on the remote UI. Then, the processing ends.

In the exemplary embodiment, in the case where there is no screen instruction, the screen to be displayed first is displayed, however, a screen being displayed on the display/operation unit 2012 can be captured and displayed on the remote UI. In such a case, in step S905, the CPU 2001 acquires the screen ID of the screen currently being displayed on the display/operation unit 2012 from the information from the operation unit I/F 2006. The screen ID of the screen currently being displayed on the display/operation unit 2012 can be always stored in a storage device such as the RAM 2002. Then, using the acquired screen ID of the screen currently being displayed on the display/operation unit 2012 and the screen information in FIG. 7, the CPU 2001 determines the order of the screen currently being displayed in the display of the defined screen transition.

In step S906, the CPU 2001 captures the screen currently being displayed. Then, the processing proceeds to step S907. In step S907, the CPU 2001 generates a web page containing the acquired captured screen. That is, the CPU 2001 generates HTML data containing a link to the data of the acquired captured screen. Depending on the order of the display of the screen determined in step S905 in the defined screen transition, the CPU 2001 generates the HTML data such that, if there is a next screen, the next screen display instruction button is also to be displayed, and if there is a previous screen, a previous screen display instruction button (described below) is also to be displayed.

In step S 903, if it is determined that there is a previous screen request instruction, the processing proceeds to step S908. In step S908, the CPU 2001 determines whether there is a previous screen from a screen ID, screen information, and an error ID being displayed on the remote UI, while the information is contained in the parameters. In this step, if there is no previous screen, the processing ends. In step S908, if there is a previous screen, the processing proceeds to step S909. In step S909, if a captured screen of the previous screen has already been generated and stored in the RAM 2002 or the HDD 2004, the CPU 2001 calls the corresponding captured image data.

If the captured screen is not stored, in this step, a screen of the previous error solution step can be newly generated. Then, the processing proceeds to step S910. In step S910, the CPU 2001 generates a web page containing the generated or acquired captured screen. That is, the CPU 2001 generates HTML data containing a link to the data of the captured screen. Further, if there is also the next screen display instruction button, and if there is also the previous screen, the CPU 2001 generates HTML data such that a previous screen display instruction button (described below) is also displayed. Then, the processing ends.

In step S903, if it is determined that there is a next screen request instruction, the processing proceeds to step S911. In step S911, the CPU 2001 determines whether there is a next screen from a screen ID, screen information, and an error ID being displayed on the remote UI, while the information is contained in the parameters. More specifically, the CPU 2001 refers to the screen information table in FIG. 7 stored in the HDD 2004, and if there are a plurality of relevant screens corresponding to the current error ID, the CPU 2001 determines whether there is a next screen from a screen ID currently being displayed on the remote UI. For example, if the current error ID is Err1, from the item 701 in the screen information table in FIG. 7, a corresponding ID is traced, in the item 702, it is found that the number of screens is four. Then, whether there is a next screen ID of the screen ID currently being referred to is determined from the information of the item 703. In step S911, if it is determined that there is no next screen, the processing ends.

In step S911, if it is determined that there is the next screen, the processing proceeds to step S912. In step S912, if a captured screen of the next screen has already been generated and stored in the RAM 2002 or the HDD 2004, the CPU 2001 calls the corresponding captured screen data. If the captured screen is not stored, in this step, a screen of the next error solution step can be newly generated. Then, the processing proceeds to step S913. In step S913, the CPU 2001 generates a web page containing the generated or called captured screen. That is, the CPU 2001 generates HTML data containing a link to the data of the captured screen. Further, if there is the previous screen, the CPU 2001 generates the HTML data such that the previous screen display instruction button is also displayed, and if there is also the next screen, the CPU 2001 generates the HTML data such that the next screen display instruction button is also displayed and transmits the page. Then, the processing ends.

Figure 10:
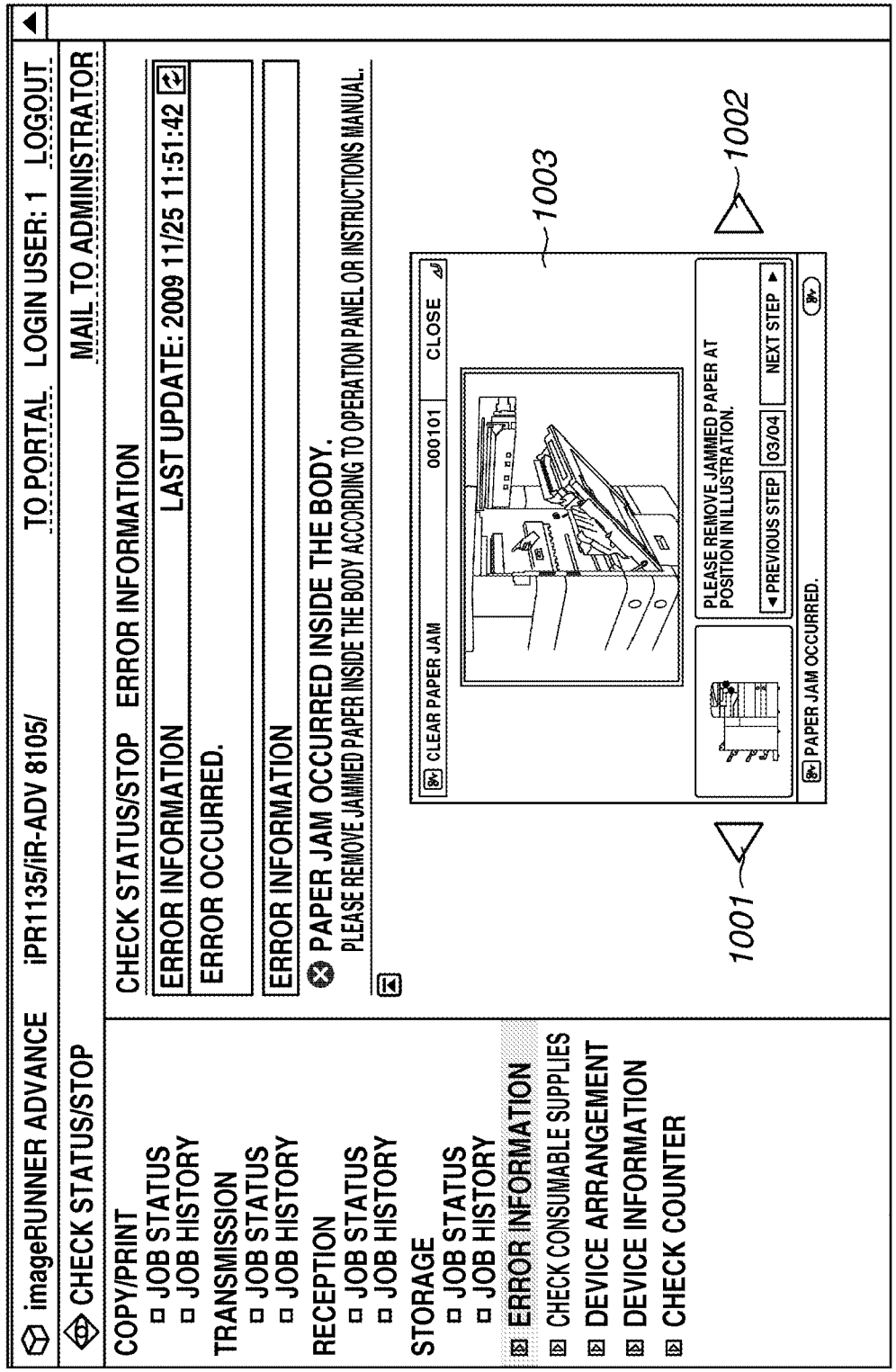
FIG. 10 is an example of a display of a web page transmitted from the image processing apparatus displayed on a web browser according to an exemplary embodiment.

FIG. 10 is an example of display of the web page transmitted from the image processing apparatus 200 on the web browser according to the exemplary embodiment. The screen is displayed on the display unit of the computer 11 by the web browser.

FIG. 10 illustrates an example of a page relating to the error information that can be browsed from the remote UI when an error occurred in the image processing apparatus 200.

In the drawing, reference numeral 1001 denotes the previous screen display instruction button. In the drawing, reference numeral 1002 denotes the next screen display instruction button. By clicking the previous screen display instruction button 1001 or the next screen display instruction button 1002, an HTTP commend is transmitted to the image processing apparatus 200 such that the screen page of the corresponding error solution step is displayed (in the above-described step S502). In the processing, in the parameters contained in the HTTP command, the error information display request instruction, the screen ID of the screen currently being displayed, or what number the screen is can be described. The image processing apparatus 200 that received the command performs the processing such that the request is satisfied, and transmits the HTML data describing the display contents in FIG. 10. Reference numeral 1003 denotes an example of the captured screen of the error solution step acquired by the above-described operation.

In the exemplary embodiment, the screen instruction request is implemented by the next screen display instruction button 1002 or the previous screen display instruction button 1001, however, it is not limited to the buttons. For example, using a pull-down menu or a radio button, by specifying the number of a step, or the like, the captured screen to be displayed can be selected.

Further, for example, to the images selected and called by the screen display in steps S906, S909, and S912, image processing such as decompression processing can be performed in corresponding CGI program processing by the CPU 2001. For example, even if the display/operation unit 2012 is a small screen, the user can check the decompressed screen by the display device of the computer 11, and accordingly, display of information easy to be seen for the user can be displayed.

As described above, in the second exemplary embodiment, the user can select a captured screen to be displayed, and the captured screens can be sequentially displayed. Further, a captured screen of particular attention can be displayed on the client. Accordingly, the display easy to be seen for the user can be displayed.

A third exemplary embodiment of the present invention is described. In the third exemplary embodiment, in displaying a captured screen of the local UI of the image processing apparatus on the remote UI, the user can select one of the display method according to the first exemplary embodiment and the display method according to the second exemplary embodiment.

In the following description, descriptions of parts overlapping with the first exemplary embodiment and the second exemplary embodiment are omitted, and only different parts are described.

Figure 11:
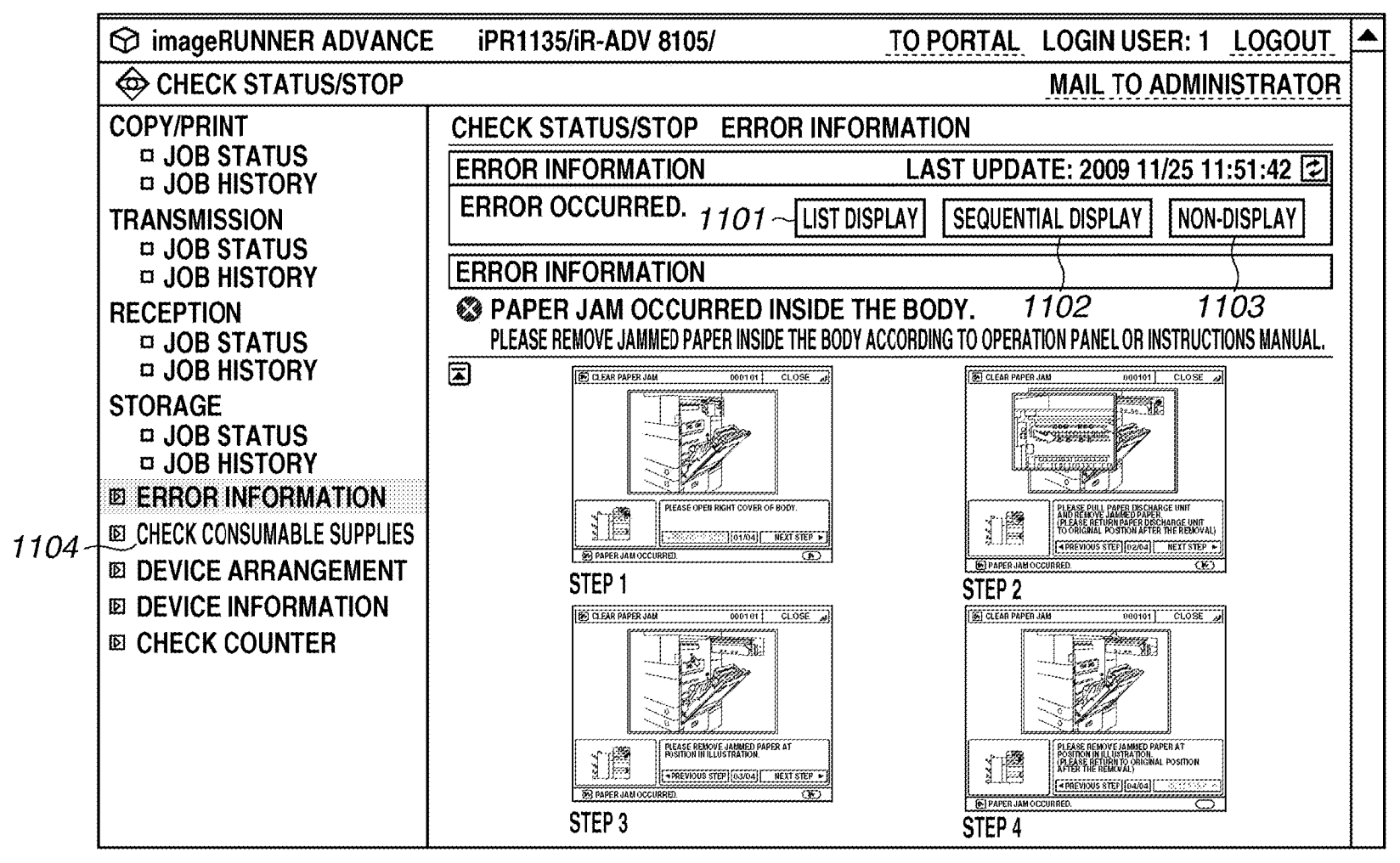

FIG. 11 is an example of display of a web page transmitted from the image processing apparatus 200 on the web browser according to the exemplary embodiment. The screen is displayed on the display unit of the computer 11 by the web browser.

FIG. 11 illustrates an example of a page relating to error information that can be browsed from the remote UI when an error occurred in the image processing apparatus 200.

In FIG. 11, reference numerals 1101, 1012, and 1013 show examples of a display method instruction. Reference numeral 1101 denotes a list display button that can be selected by the user. Similarly, reference numeral 1102 denotes a sequential display button, and reference numeral 1103 denotes a non-display button. These three buttons are exclusive with one another, and the user can select and instruct one of these display methods of the images used for a series of screen transitions.

If the list display of 1101 is selected as the selection of the user, the error solution steps of the step 1 to step 4, which are described in the first exemplary embodiment, are displayed as the list. FIG. 11 illustrates an example of the state of the display.

If the sequential display of 1102 is selected as the selection of the user, the error solution steps of the step 1 to step 4, which are described in the second exemplary embodiment, are sequentially displayed. FIG. 10 illustrates the screen on the remote UI in this case.

If the non-display of 1103 is selected as the selection of the user, it is possible not to display the captured screens of the error solution steps.

A series of selection information described above is transmitted from the computer 11 to the image processing apparatus 200 in step S502 in FIG. 5. In step S507 in FIG. 5, the CPU 2001 in the image processing apparatus 200 can identify the type of the display method or whether the instruction of the display method exists. That is, in step S507 in FIG. 5, the CPU 2001 can determine the instruction selected out of the display method instructions in FIG. 11, activate an appropriate CGI program, and according to the instructed display method, display a series of screen transitions on the client.

In the determination of the number of screens in step S605 in FIG. 6 or in step S905 in FIG. 9, if the number of screens is a single number, it is possible not to provide the display method selection means, or to display only the non-display button 1103. By the processing, the user can save the trouble.

As described above, according to the exemplary embodiment, the user can select a display method, and this enables the provision of more convenient information for the user.

Reference numeral 1104 in FIG. 11 illustrates a menu for checking consumable supplies of the remote UI. On the consumable supplies checking menu, the user can check consumable supplies such as a remaining amount of toner, a remaining amount of paper, or the like, and the screen transfers to a corresponding menu screen. If the menu is selected, not the error solution steps, but captured screens on the local UI as consumable supply replacement steps can be displayed. In this case, on the consumable supply checking screen of the remote UI, together with a message of the consumable supply information, consumable supply replacement steps are displayed in steps similar to those of the error solution steps. The user can check the consumable supply replacement steps on the remote UI, and provide the consumable supply in advance in the replacement. Accordingly, the user can save the trouble, and the more user-friendly remote UI can be provided.

Further, in operating and performing the functions of the image processing apparatus on the local UI, the user can capture the screen transition displayed on the display/operation unit 2012 and display the captured screens on the remote UI. In this case, using the error ID used in FIG. 7 as an operation ID, the description of the operation is displayed together with a message using the screen transition. Accordingly, the user can perform the operation on the local UI without confusion.

The ID that defines a series of screen transitions in the screen information table illustrated in FIG. 7 is not limited to the error ID 701, but as long as a series of screen transitions displayed on the display/operation unit 2012 is expressed, any information can be employed.

Further, in displaying the plurality of captured screens indicating a series of screen transitions on the remote UI, a screen currently being displayed on the local UI can be displayed such that the user can recognize the screen. The screen can be recognized, for example, with regard to the screen currently being displayed on the local UI, by displaying a message like "CURRENTLY BEING DISPLAYED" on the remote UI, or providing a frame only for the screen. For example, in the example in FIG. 8, in the captured screens 806 to 809, if the captured screen 807 is currently being displayed on the local UI, the captured screen 807 is emphasized and displayed on the remote UI.

For example, like in a large image processing apparatus used for Print-On-Demand (POD), in a case where a distance between a local UI and a place a jam actually occurred is far, the present invention is convenient. This is because, on a computer the user can carry around, by displaying the remote UI, for example, the remote UI in FIG. 8 according to the exemplary embodiment, the user is not required to travel back and forth between the local UI and a point where an error occurred to check whether error solution is appropriately being performed or step information to be operated next.

In the above-described exemplary embodiments, the cases of applying the present invention to the image processing apparatus that can operate as the information transmission apparatus are described. However, the present invention is not limited to the exemplary embodiments. The present invention can be applied to a system having a plurality of devices. For example, the processing in each flowchart described in the exemplary embodiments can be divided and processed by a plurality of CPUs provided in an apparatus, or processed by respective CPUs provided in a plurality of devices. Further, in the above-described exemplary embodiments, the web page provided by the information transmission apparatus is described by the HTML data, however, the web page can be described using XML or other page description languages.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-148200 filed Jun. 29, 2010, which is hereby incorporated by reference herein in its entirety.

What is claimed is:

1. An information transmission apparatus including at least one processor and memory communicatively coupled via a bus comprising:
   a generation unit configured to generate in response to a request from an information processing apparatus, a web page showing information of the information transmission apparatus and the web page further containing screen image data comprising at least one screen image in common with a screen image currently being displayed on a display unit provided in the information transmission apparatus;
   a determination unit configured to determine, based on the input of a user of the information transmission apparatus for the screen image currently displayed on on the display unit, whether the screen image displayed on the display unit is a screen image included in a set of stored screen images among at least one or more sets of stored screen images, and each of the sets of stored screen images comprises sequential screen images within each set to display a series of steps,
   wherein the generation unit generates the web page containing the image data comprising sequential screen images of the determined set of stored screen images in a case where the determination unit determines that the screen image displayed on the display unit is a screen image included in a set of stored screen images, and
   wherein the generation unit generates the web page containing the screen image data of the screen image currently being displayed on the display unit in a case where the determination unit determines that the screen image displayed on the display unit is not a screen included in one or more sets of stored screen images; and
   a transmission unit configured to transmit the generated web page to the information processing apparatus in response to the request from the information processing apparatus.

2. The information transmission apparatus according to claim 1, wherein the generation unit generates the web page for arranging and displaying the sequential screen images of the determined set.

3. The information transmission apparatus according to claim 1, wherein the generation unit generates the web page for sequentially displaying the sequential screen images of the determined set according to a user's instruction.

4. The information transmission apparatus according to claim 1, wherein the generation unit generates the web page for enabling the user to select arranging and displaying the sequential screen images of the determined set, or sequentially displaying the sequential screen images of the determined set according to the user's instruction.

5. The information transmission apparatus according to claim 1, wherein the sequential screen images of the determined set are a series of screen images for explaining steps to solve an error occurred in the information transmission apparatus.

6. The information transmission apparatus according to claim 1, further comprising:
   a capture unit configured to generate a captured screen image of the screen image displayed on the display unit, wherein the generation unit generates the web page containing the captured screen generated by the capture unit as the screen image data.

7. The information transmission apparatus according to claim 1, wherein the information transmission apparatus is an image processing apparatus, and the web page generated by the generation unit is a web page for performing setting with respect to image processing performed in the image processing apparatus.

8. A control method for an information transmission apparatus, the control method comprising:
   generating a web page showing information of the information transmission apparatus and the web page further containing screen image data comprising at least one screen image in common with a screen image currently being displayed on a display unit provided in the information transmission apparatus;
   determining, based on the input of a user of the information transmission apparatus for the screen image currently displayed on the display unit, whether the screen image displayed is a screen image included in a set of stored screen images among at least one or more sets of stored screen images, and each of the sets of stored screen images comprises sequential screen images within each set to display a series of steps;
   wherein the generation step generates the web page containing the image data comprising sequential screen images of the determined set of the stored screen images in a case where in the determining step it is determined that the screen image displayed on the display unit is a screen image included in a set of stored screen images, and wherein the generation step further generates the web page containing the image data of the screen image currently being displayed on the display unit in a case where it is determined that the screen image displayed on the display unit is not a screen image included in one or more sets of stored screen images; and
   transmitting the generated web page to the information processing apparatus in response to the request from the information processing apparatus.

9. A non-transitory computer-readable storage medium storing a computer-executable process, the computer-executable process causing a computer to execute a control method for an information transmission apparatus, comprising:

generating a web page showing information of the information transmission apparatus and the web page further containing screen image data comprising at least one screen image in common with a screen image currently being displayed on a display unit provided in the information transmission apparatus;

determining, based on the input of a user of the information transmission apparatus for the screen currently displayed on the display unit, whether the screen image displayed is a screen image included in a set of stored screen images among at least one or more sets of stored screen images, and each of the sets of stored screen images comprises sequential screen images within each set to display a series of steps;

wherein the generation step generates the web page containing the screen image data comprising sequential screen images of the determined set of the stored screen images in a case where in the determining step it is determined that the screen image displayed on the display unit is a screen image included in a set of stored screen images, and wherein the generation step further generates the web page containing the image data of the screen image currently being displayed on the display unit in a case where it is determined that the screen image displayed on the display unit is not a screen image included in one or more sets of stored screen images; and transmitting the generated web page to the information processing apparatus in response to the request from the information processing apparatus.

* * * * *